United States Patent [19]

Altman et al.

[11] 4,240,166
[45] Dec. 23, 1980

[54] WHIRLPOOL SYSTEM

[75] Inventors: Murray Altman, Fort Lee; Gerald J. Bellasalma, West Caldwell, both of N.J.

[73] Assignee: Thermasol, Ltd., Leonia, N.J.

[21] Appl. No.: 5,377

[22] Filed: Jan. 22, 1979

[51] Int. Cl.³ .............................................. A47C 19/12
[52] U.S. Cl. ........................................ 4/542; 4/492; 138/111; 138/115; 128/66
[58] Field of Search ................. 4/7, 6, 178, 180; 138/114, 115, 111; 128/66

[56] References Cited

U.S. PATENT DOCUMENTS

| | | | |
|---|---|---|---|
| 1,526,179 | 2/1925 | Parr et al. | 4/180 |
| 1,830,853 | 11/1931 | Osterhage | 4/180 |
| 2,870,456 | 1/1959 | Greensides | 4/178 |
| 3,110,754 | 11/1963 | Witort et al. | 138/115 X |
| 3,263,678 | 8/1966 | Evarston | 4/180 X |
| 3,374,492 | 3/1968 | Ruderian | 4/178 |
| 3,571,820 | 3/1971 | Jacuzzi | 4/180 |
| 3,625,258 | 12/1971 | Phelps | 138/115 |
| 3,628,529 | 12/1971 | Steimle | 128/66 |
| 3,672,359 | 6/1972 | Krohn | 4/180 |
| 3,890,656 | 6/1975 | Mathis | 4/180 X |
| 3,905,358 | 9/1975 | Jacuzzi | 128/66 |
| 4,041,553 | 8/1977 | Sussman | 4/7 |
| 4,135,255 | 1/1979 | Menendez | 4/7 |

*Primary Examiner*—Henry K. Artis
*Attorney, Agent, or Firm*—Lerner, David, Littenberg & Samuel

[57] ABSTRACT

A whirlpool system has a pair of channels which connect sources of water and air to a plurality of outlets in a water receptacle. Each of the channels is formed in a continuous piece of tubing which is connected to the outlets by a plurality of connector assemblies removably mounted to the tubing between the ends thereof. If the tubing is made from a thermoplastic material, the tubing may be inserted into a hot liquid bath and, after the thermoplastic material becomes sufficiently soft, bent into a desired shape or configuration.

30 Claims, 11 Drawing Figures

4,240,166

WHIRLPOOL SYSTEM

FIELD OF THE INVENTION

The present invention relates to whirlpool systems and, more particularly, to such systems which are adapted for use in conventional bathtub installations.

BACKGROUND OF THE INVENTION

Recently, travelers, businessmen, skiers, golfers, tennis players and other sportsmen have become increasingly aware of the benefits of a whirlpool bath in which water is agitated to create an invigorating whirlpool motion. The swirling waters of a whirlpool bath are believed by many to calm frayed nerves, ease the pain of aching muscles, and sooth sore feet.

In recognition of the increasing popularity of whirlpool baths, many motels, hotels, and inns are installing in-room whirlpool baths in an effort to gain a competitive edge. However, in order to be profitable, and therefore result in a true competitive edge, such whirlpool baths must be simple to install, operate, and service.

Some known whirlpool baths, such as the one disclosed in Jacuzzi U.S. Pat. No. 3,571,820, include a number of jet assemblies spaced around the outer periphery of a bathtub for agitating water in the bathtub. In these known whirlpool baths, a water and air supply piping systems, including several pieces of pipe joined together by elbows and T-fittings, are used to supply each of the jet assemblies with water and air, respectively. The installation of the elbows and T-fittings increases construction time and costs, in terms of both materials and labor. The elbows and T-fittings also complicate repairs and replacement.

Everston U.S. Pat. No. 3,263,678 discloses a therapeutic bathtub having a plurality of aspirating fittings designed specifically to diffuse finely divided air bubbles throughout the water in the bathtub. Thus, the aspirating fittings perform a function, i.e., the diffusion of finely divided bubbles, which is different than and may be performed in addition to the conventional function of providing agitated water to produce a whirlpool bath. Nevertheless, the aspirator fittings are supplied water and air from a piping network in which several individual pieces of pipe are interconnected by elbows and T-fittings.

Efforts have been made to avoid the problems and disadvantages resulting from the use of elbows and T-fittings in whirlpool systems. For instance, in Mathis U.S. Pat. No. 3,890,656, there is disclosed a whirlpool jet for bathtubs which purportedly eliminates the use of T-fittings by making all water and air pipe connections directly to a corresponding water jet outlet. However, because the water jet outlets described and claimed in the Mathis patent are actually T-fittings, which have been designed to perform a jetting function, the water jet outlets of each pair of adjacent outlets are connected by separate pieces of water and air supply pipes. The provision of several pieces of pipe not only complicates installation, thereby increasing initial construction time and costs, but also complicates repairs and replacements resulting in increased maintenance costs. Furthermore, inasmuch as the individual outlets are permanently cemented to the water and air supply pipes, the outlets are totally incapable of quick and easy on-site removal independently of the water and air supply pipes for inspection, cleaning and replacement purposes.

SUMMARY OF THE INVENTION

Many of the disadvantages and shortcomings of the whirlpool baths and other devices discussed above are overcome by the present invention which includes new and improved piping arrangements and connector assemblies for use in a whirlpool system normally including a plurality of outlets spaced around the interior of a water receptacle, such as a bathtub, a water supply channel connected to a source of water, and an air supply channel connected to a source of air. In accordance with one aspect of the improvement, the water supply channel is formed in a continuous member and the air supply channel is formed in a continuous member.

In one especially advantageous embodiment, the channels are adjacent channels of a single piece of dual channel tubing. The dual channel tubing can be made economically fron a suitable thermoplastic material which is extruded in a continuous straight length. Due to the lightweight of the thermoplastic material, the tubing is easy to handle, ship and install.

Another novel feature of the present invention involves a method of bending the dual channel tubing, whereby the shape of the length of tubing can be matched with the outer contour of a bathtub. In accordance with the method, the tubing is maintained in a bath of hot liquid, such as triethylene glycol heated to about 230°-260° F., until the thermoplastic material becomes soft and bendable. As long as the thermoplastic material remains soft, the tubing can be bent into almost any desired shape or configuration.

In the whirlpool system of the present invention, each of the outlets is connected to the air and water supply channels by a unique removable connector assembly which, in one advantageous embodiment, includes a nozzle adapted to extend into both of the channels, one end of the nozzle being connected to a respective one of the outlets. The nozzle includes a passageway, which extends through the nozzle from one end thereof to the other end, and a pair of inlet openings. One of the inlet openings communicates between the passageway and one of the channels to permit air to flow from the channel to an associated outlet. The other inlet opening communicates between the passageway and the other channel to form a flow path for water from the channel to a corresponding outlet. Although both the water and the air can be supplied under pressure, the portion of the passageway between the inlet openings includes a venturi for enhancing the mixture of air and water and for speeding their flow through the passageway.

Because the nozzle is inserted into the channels, it can be installed simply by providing an appropriate number of access openings to the channels, thereby permitting the channels to be formed in a single piece of dual channel tubing or a pair of individual continuous conduits. If the other end of the passageway lies outside of the channels, it can be capped with a removable plug which, when removed, provides quick and easy access to the interior of the nozzle for cleaning and inspection purposes without necessitating the removal of the nozzle or the dismantling of the entire whirlpool system.

Alternatively, the connector assemblies can be saddle clamps having a pair of saddle members which are movable with respect to each other so as to clamp over the outer surface of a piece of dual channel tubing or a pair of individual continuous conduits. One of the saddle members has a passageway which communicates with the water and air channels and a respective one of the outlets. A venturi is provided, either in the passageway or, if the channels are formed in a single piece of dual channel tubing, in the partition between adjacent channels of the dual channel tubing, for enhancing the mixture of air and water and for speeding the flow of air and water through the passageway.

Like the nozzles discussed above, the saddle clamps may be removed without dismantling the entire whirlpool system. Also, by providing a suitable access opening to the passageway, it can be made accessible for quick and easy inspection, and if necessary, cleaning or removal.

BRIEF DESCRIPTION OF THE DRAWINGS

For a more complete understanding of the invention, reference may be had to the following description of the exemplary embodiment taken in conjunction with the accompanying figures of the drawings, in which.

DESCRIPTION OF THE EXEMPLARY EMBODIMENTS

I. The Overall System

Figure 1:
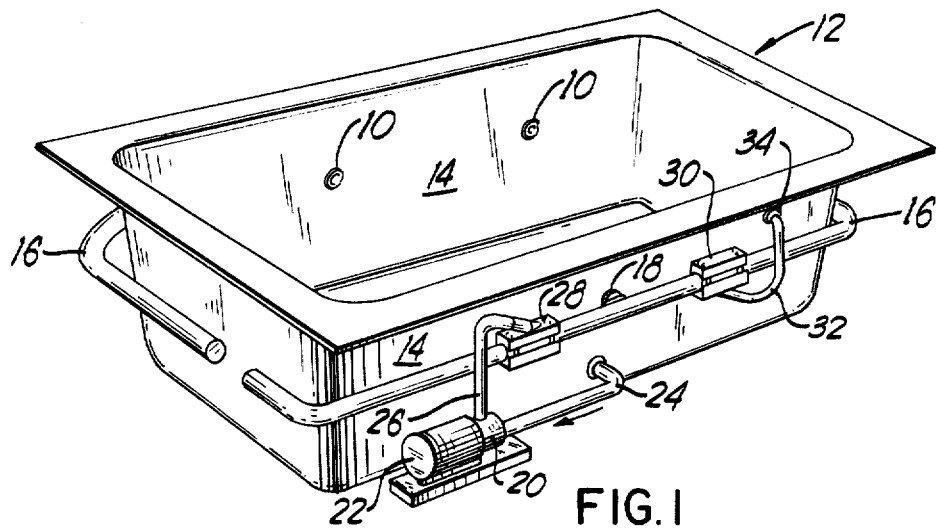
FIG. 1 is a perspective view of one embodiment of a whirlpool system constructed in accordance with the present invention.

The whirlpool system shown in FIG. 1 includes a number of outlets 10 which are spaced apart around the periphery of a bathtub 12. Each of the outlets 10 extends through a sidewall 14 of the bathtub 12 below a predetermined water level line and is connected to a continuous loop of dual channel tubing 16 by a connector assembly 18. The loop of dual channel tubing 16 has a shape which generally matches the outer contour of the bathtub 12.

A pump 20, driven by a motor 22, receives water from the bathtub 12 through a return line 24, which communicates with the interior of the bathtub 12 below its predetermined water level line. Water under pressure is supplied from the pump 20 to one channel of the dual channel tubing 16 through a flexible hose 26 and a saddle clamp type connector 28. Another saddle clamp type connector 30 is connected by a flexible hose 32 to an air port 34 located above the predetermined water level line of the bathtub 12, so that the port 34 will always be open to the atmosphere for supplying air to the other channel of the dual channel tubing 16 at atmospheric pressure.

Figure 4:
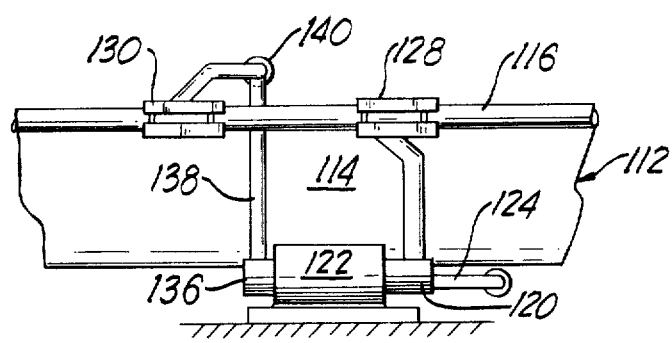
FIG. 4 is a partial elevational view of a second exemplary embodiment of a whirlpool system constructed in accordance with the present invention.
Figure 10:
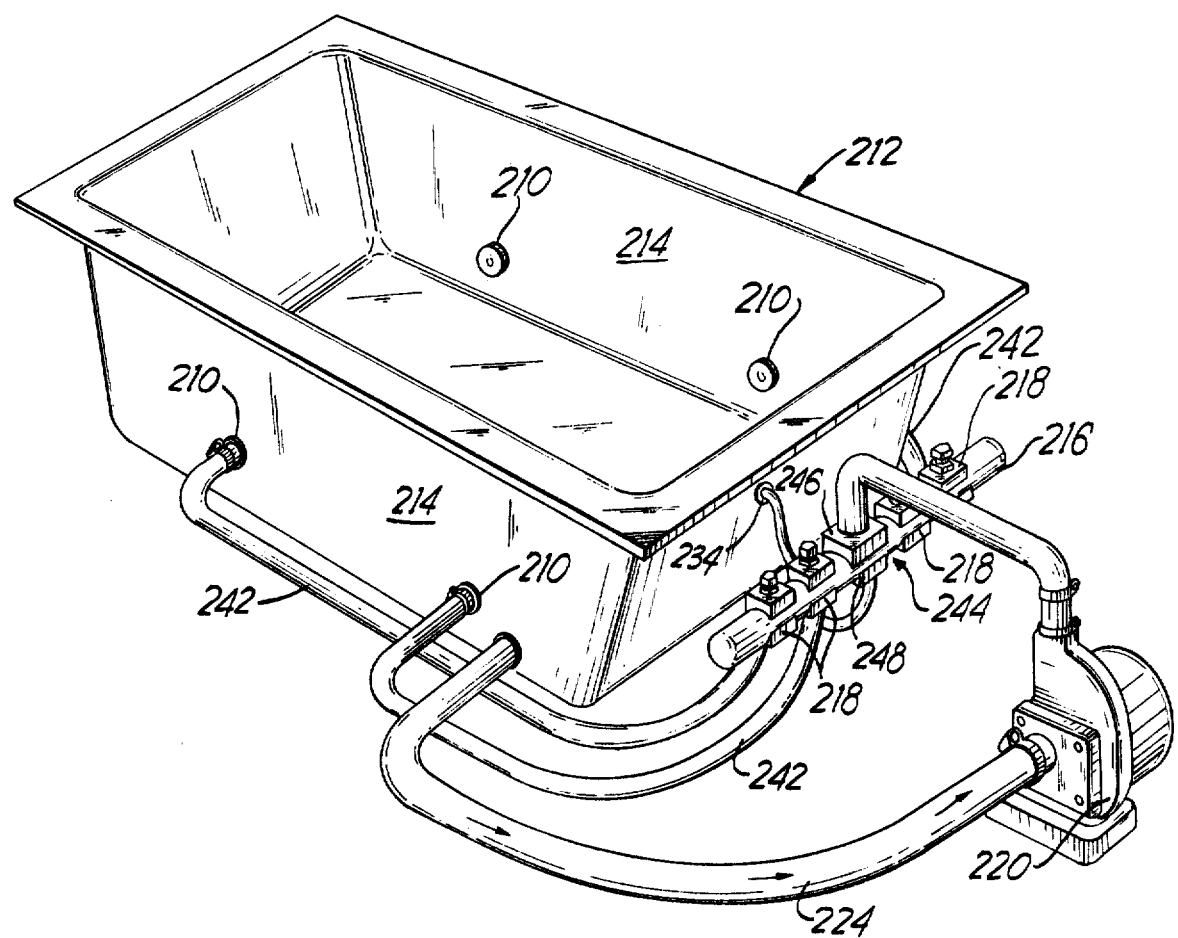
FIG. 10 is a perspective view of a third exemplary embodiment of a whirlpool system constructed in accordance with the present invention.

Other exemplary embodiments of the whirlpool system of FIG. 1 are illustrated in FIGS. 4 and 10. The various elements illustrated in FIGS. 4 and 10 which correspond to elements described above with respect to FIG. 1 have been designated by corresponding reference numerals increased by 100 and 200, respectively. The embodiments of FIGS. 4 and 10 operate in the same manner as the embodiment of FIG. 1, unless it is otherwise stated.

Referring now to FIG. 4, a pump 120 and a compressor 136 are driven by a double-ended motor 122, so that air at greater than atmospheric pressure can be supplied to one channel of dual channel tubing 116 through a supply line 138 and a saddle clamp type connector 130. Alternatively, the pump 120 and the compressor 136 can be driven by a pair of separate motors.

The pressure of the air can be regulated from inside a bathtub 112 by a conventional air pressure regulator 140 communicating with the supply line 138. Supplying air under pressure via the compressor 136, the supply line 138, and the regulator 140 eliminates the need for the flexible hose 32 and the port 34 of the embodiment of FIG. 1.

The whirlpool system shown in FIG. 10 includes dual channel tubing 216 and a number of connector assemblies 218 removably mounted to the dual channel tubing 216, which therefore acts as a header. Because the dual channel tubing 216 is located at one end of a bathtub 212, the connector assemblies 218 are relatively remote from at least some outlets 210, each of which is connected to a corresponding one of the connector assemblies 218 by a flexible hose 242 or any other suitable conduit. The location of the dual channel tubing 216 can be changed depending upon the configuration of the overall whirlpool system.

A saddle clamp type connector 244 replaces the saddle clamp type connectors 28 and 30 of the embodiment shown in FIG. 1. More particularly, the saddle clamp type connector 244 has an upper clamp member 246, which connects a pump 220 to one channel of the dual channel tubing 216, and a lower clamp member 248, which connects an air port 234 to the other channel of the dual channel tubing 216.

II. The Nozzle Type Connector Assembly Embodiments

Figure 3:
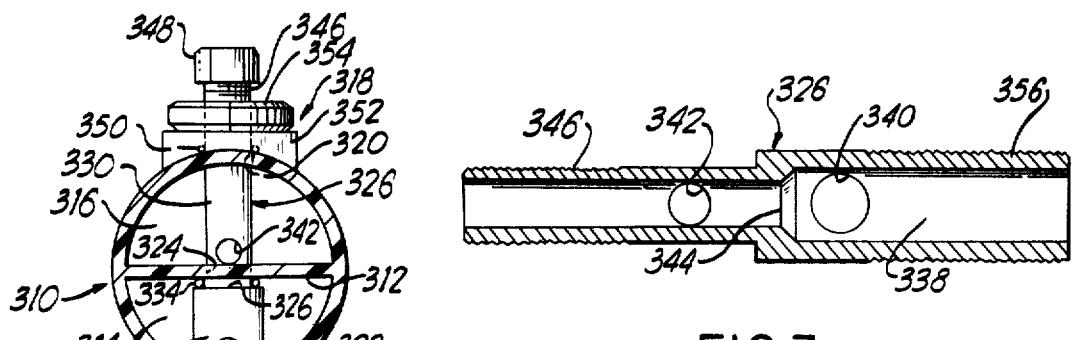
FIG. 3 is a cross-sectional view of a nozzle utilized in the connector assembly illustrated in FIG. 2.
Figure 2:
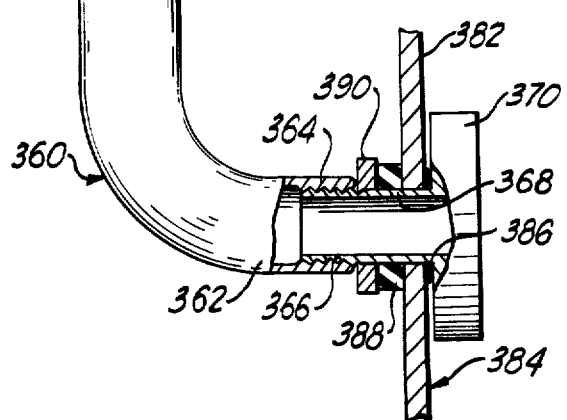
FIG. 2 is a partial cross-sectional view of a first exemplary embodiment of a connector assembly constructed in accordance with the present invention.

As shown in FIGS. 2 and 3, dual channel tubing 310 has a cylindrical shape, although any other suitable shape may be used, with a partition 312 extending across the interior of the tubing 310 to form an air channel 314 and a water channel 316. Although the partition 312 is shown extending across a diameter of the dual channel tubing 310, the partition 312 may extend across any chord of the tubing 310.

At each location where a connector assembly 318 is to be inserted through the dual channel tubing 310, a pair of holes 320, 322 is provided, the hole 320 being formed in the top of the tubing 310 diametrically opposite the hole 322, which is formed in the bottom of the tubing 310. Another hole 324, having a diameter substantially equal to the diameter of the hole 320 but somewhat less than the diameter of the hole 322, is formed in the partition 312 and aligned with the holes 320, 322, so that a nozzle 326 can be inserted therethrough.

The nozzle 326, which forms a part of a corresponding connector assembly 318, includes a small diameter portion 330, which extends through the holes 320, 324 and the water channel 316, and a large diameter portion 332, which extends through the hole 322 and into the air channel 314. An O-ring 334 interposed between the partition 312 and a shoulder 336 formed at the juncture of the small diameter portion 330 and the large diameter portion 332 forms a fluid-tight seal between the air channel 314 and the water channel 316.

A fluid passageway 338 (see FIG. 3) runs the length of the nozzle 326 and communicates with the air channel 314 and the water channel 316 through an air inlet opening 340 and a water inlet opening 342, respectively. To facilitate drainage of water from the dual channel tubing 310, the bottoms of the air inlet opening 340 and the water inlet opening 342 are at an elevation no higher than the elevation of the bottoms of the air channel 314 and the water channel 316, respectively. The portion of the passageway 338 between the air inlet opening 340 and the water inlet opening 342 includes a venturi 344 (see FIG. 3) designed to enhance the mixing of water and air in the passageway 338 and to speed the flow of water and air through the passageway 338.

The free end of the small diameter portion 330 extends upwardly through the hole 320 formed in the top of the dual channel tubing 310 and is provided with an externally threaded portion 346 designed to threadedly engage an internally threaded cap 348. By removing the cap 348, access may be had to the passageway 338 for the purposes of inspection and cleaning.

An O-ring 350, disposed about the free end of the small diameter portion 330, seals the hole 320 formed in the top of the dual channel tubing 310. The O-ring 350 is held in sealing engagement against the top of the tubing 310 by a jaw member 352, slidably received on the free end of the small diameter portion 330 of the nozzle 326, and a lock nut 354, having an internally threaded portion (not shown) which threadedly engages the externally threaded portion 346 of the free end of the small diameter portion 330, for forcing the jaw member 352 into positive engagement with the O-ring 350.

The free end of the large diameter portion 332 of the nozzle 326 extends downwardly through the hole 322 in the bottom of the dual channel tubing 310. An externally threaded portion 356 provided on the free end of the large diameter portion 332 threadedly engages an internally threaded portion (not shown) formed in the vertical end 358 of a relatively rigid elbow 360. The horizontal end 362 of the elbow 360 has an internally threaded portion 364 which threadedly engages an externally threaded portion 366 formed on a stem portion 368 of an outlet 370. Although the elbow 360 is shown as having a 90° bend, the bend can be more or less than 90° depending upon the designs and relative positions of the nozzle 326 and the outlet 370. Moreover, the elbow 360 could be replaced by a flexible hose, or any other suitable connecting device.

An O-ring 372, disposed about the free end of the large diameter portion 332, seals the hole 322 formed in the bottom of the dual channel tubing 310. The O-ring 372 is held in sealing engagement against the bottom of the tubing 310 by a jaw member 374, which is slidably received on the free end of the large diameter portion 332 and forced into positive engagement with the O-ring 372 by a lock nut 376 threadedly engaged on the free end of the large diameter portion 332.

A fluid-tight seal is also formed between the outlet 370 and a sidewall 382 of a bathtub 384 by an O-ring 386, a gasket 388, and a lock nut 390. The O-ring 386 is disposed about the stem portion 368 of the outlet 370 between the outlet 370 and the sidewall 382. The gasket 388 and the lock nut 390 are also disposed about the stem portion 368, but on the opposite side of the sidewall 382 from the O-ring 386. The lock nut 390 threadedly engages the externally threaded portion 366 of the stem portion 368 so as to force the O-ring 386 and the gasket 388, both of which can be made of rubber or any other suitable material, into sealing engagement with the sidewall 382 of the bathtub 384.

Figure 6:
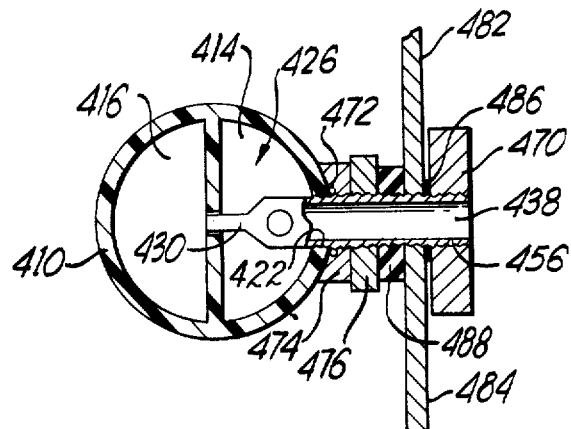
FIG. 6 is a cross-sectional view of a third exemplary embodiment of a connector assembly constructed in accordance with the present invention.
Figure 9:
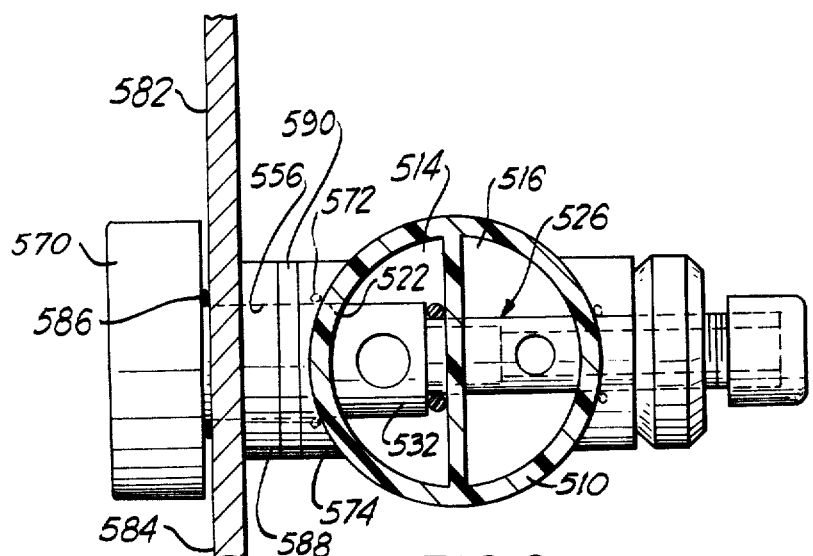
FIG. 9 is a cross-sectional view of a sixth exemplary embodiment of a connector assembly constructed in accordance with the present invention.

Referring now to FIGS. 6 and 9, there are shown two further embodiments of the exemplary connector assembly embodiment of FIGS. 2 and 3. The various elements illustrated in FIGS. 6 and 9 which correspond to elements described above with respect to FIGS. 2 and 3 have been designated by corresponding reference numerals increased by 100 and 200, respectively. Unless otherwise stated, the further embodiments operate in the same manner as the embodiment of FIGS. 2 and 3.

In the embodiment of FIG. 6, a horizontally extending nozzle 426 has a small diameter portion 430 which communicates with a water channel 416 but does not extend therethrough. The interior end of a passageway 438 extending through the nozzle 426 functions as a water inlet, thereby replacing the water inlet opening 342 of the embodiment of FIGS. 2 and 3. An outlet 470 is adapted to threadedly engage a threaded portion 456 on the nozzle 426. An O-ring 472, jaw member 474, gasket 488, and lock nut 476 are positioned between a sidewall 482 of a bathtub 484 and the outer circumferential surface of a continuous loop of dual channel tubing 410 to form a water-tight seal for an opening 422 in the side of the tubing 410. The lock nut 476 forces the O-ring 472 into sealing engagement with the dual channel tubing 410. Another O-ring 486 and the gasket 488 are forced into sealing engagement with the sidewall 482 of the bathtub 484 by the outlet 470. Although the direct connection of the nozzle 426 with the outlet 470 eliminates the elbow 360 of the embodiment of FIGS. 2 and 3, it necessitates arranging the water channel 416 alongside an air channel 414, rather than above it.

The embodiment of FIG. 9 also includes a continuous piece of dual channel tubing 510 having a water channel 516, which is arranged alongside an air channel 514. Because the elbow 360 of the embodiment of FIGS. 2 and 3 is dispensed with, an outlet 570 is internally threaded so that it can threadedly engage an externally threaded portion 556 on the free end of a large diameter portion 532 of a nozzle 526. O-rings 572, 586, jaw member 574, gasket 588, and lock nut 576 form a water-tight seal for an opening 522 in the side of the tubing 510 and an opening in a sidewall 582 of a bathtub 584.

III. The Saddle Clamp Type Connector Assembly Embodiments

Figure 5:
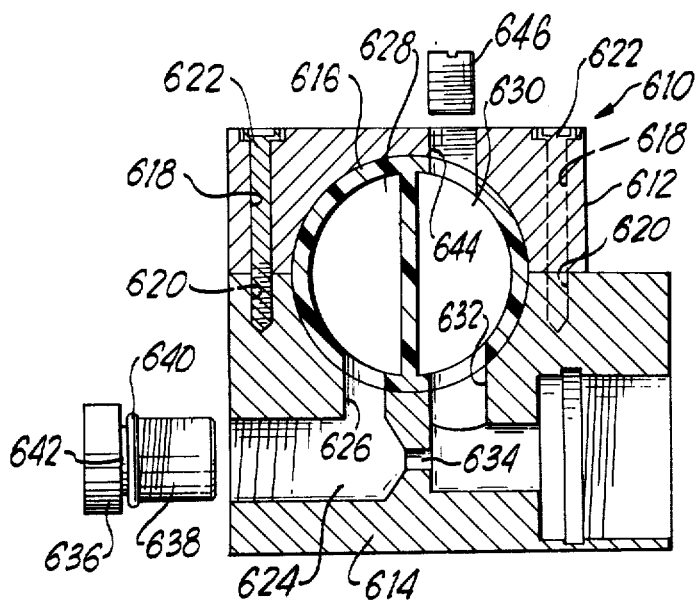
FIG. 5 is a cross-sectional view of a second exemplary embodiment of a connector assembly constructed in accordance with the present invention.

As shown in FIG. 5, a saddle clamp 610 includes a pair of clamp members 612, 614. The saddle member 612 is positioned to the upper side of a piece of dual channel tubing 616, the saddle member 614 being positioned to the lower side of the tubing 616 substantially diametrically opposite the saddle member 612.

The saddle member 612 has holes 618 passing completely therethrough. The holes 618 are aligned with blind bores 620 in the adjacent surface of the saddle member 614. The holes 618 and the bores 620 are internally threaded so as to receive externally threaded bolts 622 which maintain the saddle members 612 and 614 clamped about the tubing 616. The bolts 622 also permit the position of the saddle members 612, 614 to be adjusted with respect to each other.

The saddle member 614 includes a passageway 624 extending therethrough below the dual channel tubing 616. A water inlet opening 626 communicates between a water channel 628 of the tubing 616 and the passageway 624. The passageway 624 also communicates with an air channel 630 through an air inlet opening 632 in the saddle member 614. The portion of the passageway 624 between the water inlet opening 626 and the air inlet opening 632 includes a venturi 634 for enhancing the mixture of water and air and for speeding the flow of the water and air through the passageway 624. The end of the passageway 624 nearest the air inlet opening 632 is internally threaded so as to receive an externally threaded portion of an outlet (not shown) mounted in the sidewall of a water receptacle, such as a bathtub. A plug 636 has an externally threaded portion 638 which threadedly engages an internally threaded portion of the passageway 624 at the opposite end thereof. An O-ring 640 is disposed about a shank portion 642 of the plug 636 to provide a water-tight seal.

The saddle member 612 has an internally threaded opening 644 which communicates at one end with the air channel 630 of the tubing 610. An externally threaded plug 646 is threadedly received in the opening 644, so that the air channel 630 may be selectively opened and closed to the atmosphere.

Figure 7:
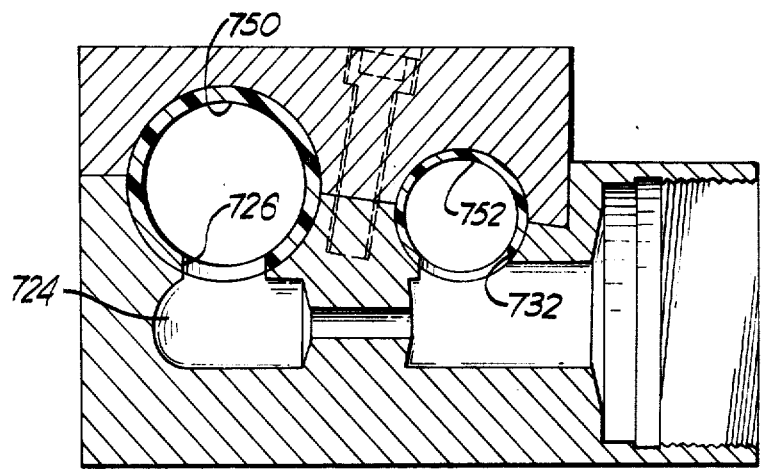
FIG. 7 is a cross-sectional view of a fourth exemplary embodiment of a connector assembly constructed in accordance with the present invention.
Figure 8:
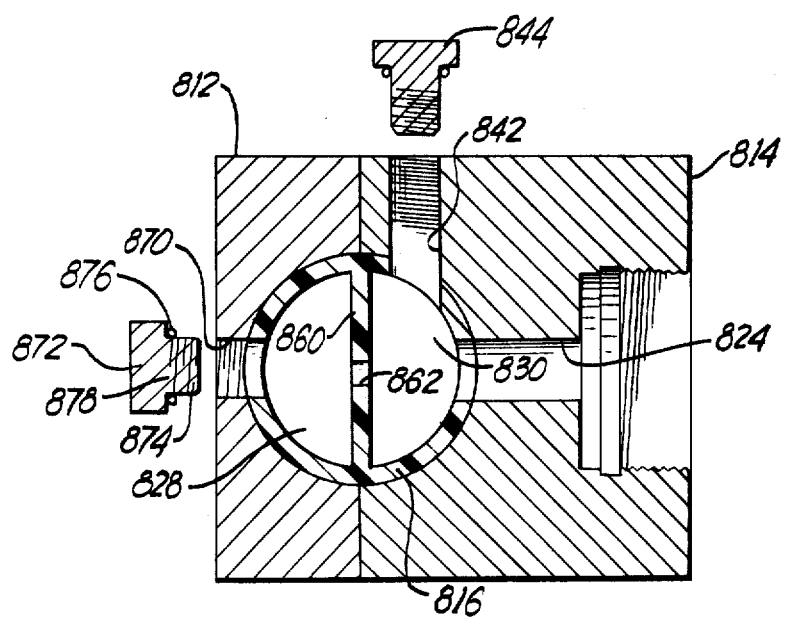
FIG. 8 is a cross-sectional view of a fifth exemplary embodiment of a connector assembly constructed in accordance with the present invention.

FIGS. 7 and 8 illustrate further exemplary embodiments of the connector assembly of FIG. 5. The various elements illustrated in FIGS. 7 and 8 which correspond to elements described above with respect to FIG. 5 have been designated by corresponding reference numerals increased by 100 and 200, respectively. The embodiments of FIGS. 7 and 8 operate in the same manner as the embodiment of FIG. 5, unless it is otherwise stated.

Referring to FIG. 7, a water inlet opening 726 of a passageway 724 communicates with the interior of a water supply conduit 750. An air inlet opening 732 communicates between the passageway 724 and the interior of an air supply conduit 752.

As shown in FIG. 8, a piece of dual channel tubing 816 is flanked on either side by saddle members 812, 814. The tubing 816 includes a partition 860 which extends across the interior thereof along a diameter or any other chord. An aperture 862 in the partition 860 permits a water channel 828 on one side of the partition 860 to communicate with an air channel 830 on the other side of the partition 860, the aperture 862 acting as a venturi for enhancing the mixture of water and air and for speeding the flow of water and air out of the tubing 816 and through a passageway 824 provided in the saddle member 814.

A vertical opening 842 in the saddle member 814 connects the air channel 830 to the atmosphere. A plug 844 threadedly received in the opening 842 permits the selective opening and closing of the air channel 830 to the atmosphere.

A horizontal internally threaded opening 870 in the saddle member 812 communicates with a water channel 828 of the tubing 816. A plug 872 has an externally threaded opening 870 in the saddle member 812 for permitting access to the water channel 828. An O-ring 876 disposed about a shank portion 878 of the plug 872 forms a water-tight seal.

IV. The Method of Bending Dual Channel Tubing

When a piece of dual channel tubing, like the dual channel tubing described above, is extruded in a single straight length of thermoplastic material, the tubing must be bent in order to match the contour of a water receptacle, such as a bathtub. One especially advantageous method of bending such tubing involves using a Greenlee No. 850 PVC Bender which is filled with triethylene glycol. After the triethylene glycol is heated to about 230°-260° F., the dual channel tubing is inserted into the bath and maintained therein until the thermoplastic material is sufficiently soft so as to render the tubing bendable. The tubing can then be bent, either in a direction perpendicular to or parallel to the partition extending across the interior of the tubing.

Figure 11:
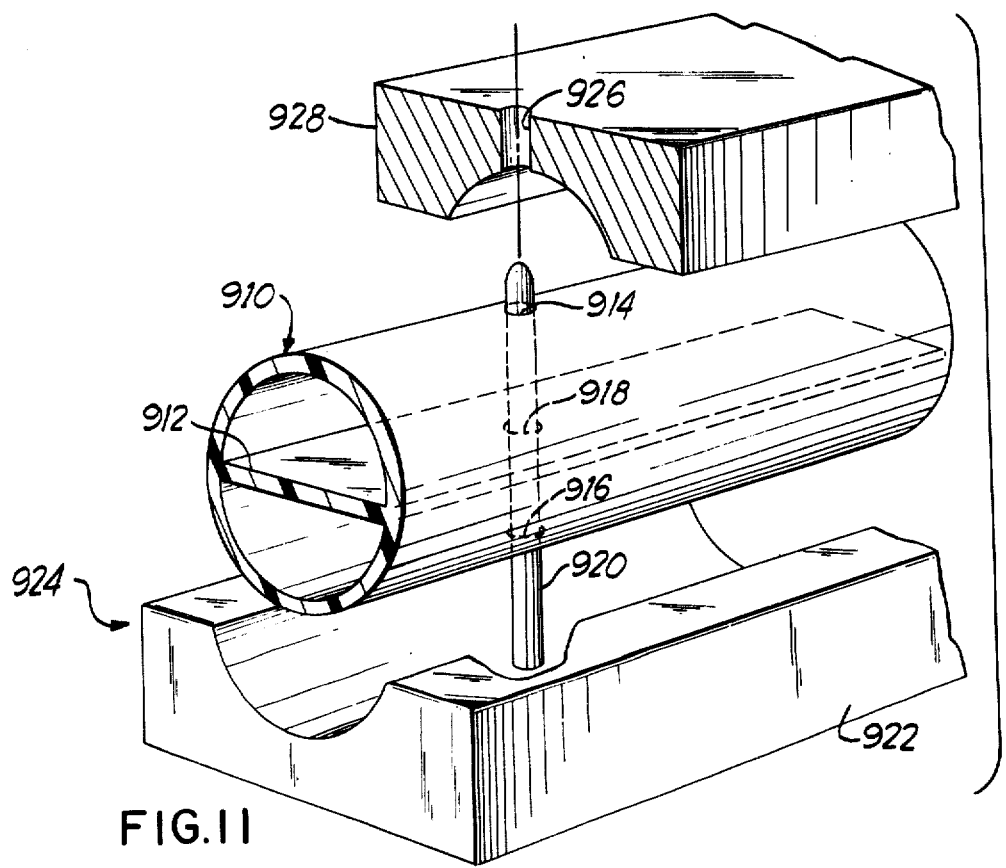
FIG. 11 is an exploded view of a clamp assembly useful in bending dual channel tubing in accordance with the present invention.

If difficulties are encountered in maintaining the original shape of the softened tubing, including the partition, during its cooling, the following procedure, which is described below with reference to FIG. 11, may be followed. Referring to FIG. 11, dual channel tubing 910 has a partition 912 which runs the length thereof. At predetermined locations, corresponding to the locations where a connector assembly will be attached to the tubing, three aligned holes 914, 916, 918 are formed in the tubing 910 prior to its softening. The holes 914, 916 are formed in opposite sides of the tubing 910, the other hole 918 being formed in the partition 912.

Either prior to, simultaneously with or immediately after the bending of the tubing 910 into a desired shape, a peg 920, which extends upwardly from a lower saddle member 922 of a saddle clamp 924, is inserted through the holes 914, 916, 918, and into a hole 926 in an upper saddle member 928 of the saddle clamp 924 to help maintain the original shape of the partition 912 as well as its proper orientation with respect to the rest of the tubing 910. The saddle members 922 and 928 are then clamped over the outer surface of the tubing to help maintain its original cross-sectional shape, thereby aiding in the support of the softened partition 912.

The tubing 910 can be cooled at room temperature. Alternatively, cooling of the tubing 910 can be expedited by passing a cool fluid, such as air or water, in and/or around the softened tubing 910.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

What is claimed is:

1. In a whirlpool system including a water receptacle, a plurality of outlets spaced around the interior of the water receptacle, a water supply channel connected to a source of water, an air supply channel connected to a source of air, and connecting means for receiving water and air from the water and air supply channels, respectively, for mixing the received water and air, and for delivering the mixed water and air to each of the outlets, the improvement wherein the water supply channel is one channel of a continuous single piece of multiple channel tubing and the air supply channel is another channel of said multiple channel tubing.

2. A whirlpool system according to claim 1, wherein the water supply channel is one channel of a single piece of dual channel tubing and the air supply channel is the other channel of said dual channel tubing.

3. A whirlpool system according to claim 2, wherein the outer surface of said dual channel tubing has a generally circular transverse cross-sectional shape, said tubing including a partition extending across the interior thereof to form said one channel and said other channel.

4. A whirlpool system according to claim 3, wherein said partition extends generally diametrically across said interior of said dual channel tubing.

5. A whirlpool system according to claim 2, wherein said connecting means includes a plurality of nozzles, one for each of the outlets, each of said nozzles extending through said dual channel tubing from said one channel to said other channel, one end of each of said nozzles extending outwardly from said one channel and the other end of each of said nozzles extending outwardly from said other channel for connection to a corresponding one of the outlets, each of said nozzles including a passageway extending therethrough from said one end to said other end, a water inlet opening communicating between said one channel and said passageway, and an air inlet opening communicating between said other channel and said passageway, the portion of said passageway between said air inlet opening and said water inlet opening including a venturi.

6. A whirlpool system according to claim 5, wherein said one end of each of said nozzles removably receives cap means for selectively permitting and preventing access to said passageway of a corresponding one of said nozzles.

7. A whirlpool system according to claim 5, wherein said other end of each of said nozzles is directly connected to a corresponding one of the outlets.

8. A whirlpool system according to claim 5, wherein said one channel is located generally above said other channel.

9. A whirlpool system according to claim 8, further comprising a plurality of conduits, each of said conduits being connected between a corresponding one of the outlets and said other end of a corresponding one of the nozzles.

10. A whirlpool system according to claim 9, wherein each of said conduits is a relatively rigid elbow.

11. A whirlpool system according to claim 9, wherein each of said conduits is a relatively flexible hose.

12. A whirlpool system according to claim 9, wherein said water inlet opening is located in the vicinity of the lowermost portion of said one channel and said air inlet opening is located in the vicinity of the lowermost portion of said other channel.

13. A whirlpool system according to claim 5, further comprising means for supplying water under pressure to said one channel and for supplying air at greater than atmospheric pressure to said other channel.

14. A whirlpool system according to claim 5, wherein the outer surface of said dual channel tubing has a substantially circular transverse cross-sectional shape, said tubing including a partition extending across the interior thereof to form said one channel and said other channel, said nozzles extending through said tubing substantially perpendicular to said partition.

15. A whirlpool system according to claim 14, wherein said partition extends generally diametrically across said interior of said dual channel tubing and said nozzles extend generally diametrically through said tubing.

16. A whirlpool system according to claim 2, wherein said dual channel tubing has an overall shape which generally matches the outer contour of said receptacle.

17. A whirlpool system according to claim 16, wherein said dual channel tubing is positioned in close proximity to said receptacle.

18. A whirlpool system according to claim 2, wherein said dual channel tubing is a header positioned remote from at least some of the outlets, said connecting means including a plurality of mixing chambers, one for each of the outlets, each of said mixing chambers being positioned in the vicinity of said header for mixing the received water and air, and a plurality of relatively flexible hoses, one for each of the mixing chambers, each of said hoses connecting a corresponding one of said mixing chambers to a corresponding one of the outlets for delivering the mixed water and air to the outlets.

19. A whirlpool system according to claim 2, wherein said connecting means includes a plurality of saddle clamps, one for each of the outlets, each of said saddle clamps including a pair of saddle members, one of said saddle members being positioned to one side of said dual channel tubing and the other of said saddle members being positioned to an opposite side of said tubing, said one of said saddle members having a passageway extending therethrough and communicating with a corresponding one of the outlets, a water inlet opening communicating between said passageway and said one channel of said dual channel tubing, and an air inlet opening communicating between said passageway and said other channel of said dual channel tubing, the portion of said passageway between said air inlet opening and said water inlet opening including a venturi.

20. A whirlpool system according to claim 19, wherein said other of said saddle members includes another air inlet opening communicating at one end with said other channel of said dual channel tubing, the other end of said another air inlet opening being open to the atmosphere.

21. A whirlpool system according to claim 20, further comprising a plurality of plugs, one for each of said saddle clamps, each of said plugs being removably received in an end of said passageway of a corresponding one of said saddle clamps.

22. A whirlpool system according to claim 2, wherein said connector means includes a plurality of saddle clamps, one for each of the outlets, each of said saddle clamps including a pair of saddle members, one of said saddle members being positioned to one side of said dual channel tubing and the other of said saddle members being positioned to an opposite side of said tubing, one of said saddle members having a passageway extending therethrough and communicating between said other channel of said dual channel tubing and a corresponding one of the outlets, said dual channel tubing have a partition dividing said tubing into said one channel and said other channel, said partition having an aperture therethrough so that said one channel communicates with said other channel, said aperture functioning as a venturi.

23. A whirlpool system according to claim 2, wherein said dual channel tubing has a partition separating said one channel from said other channel, said partition having openings therethrough so that said one channel communicates with said other channel; and wherein said connecting means includes a plurality of nozzles, one for each of the outlets, each of said nozzles extending through said other channel of said dual channel tubing, one end of each of said nozzles extending outwardly of said other channel for connection to a corresponding one of the outlets and the other end of each of said nozzles being received in a corresponding one of said openings in said partition, each of said nozzles including a passageway extending therethrough from said one end to said other end, and an air inlet opening communicating between said passageway and said other channel of said dual channel tubing, the portion of said passageway between said air inlet opening and said other end of said nozzle including a venturi.

24. A whirlpool system, comprising a water receptacle, a plurality of outlets spaced around the interior of the water receptacle, a water supply channel formed in a first continuous tube and connected to a source of water, an air supply channel formed in a second continuous tube and connected to a source of air, and connecting means for receiving water and air from said water and air supply channels, respectively, for mixing the received water and air, and for delivering the mixed water and air to each of said outlets, said connecting means including a plurality of saddle clamps, one for each of said outlets, each of said saddle clamps including a pair of saddle members, one of said saddle members having a passageway communicating with a corresponding one of said outlets, a water inlet opening communicating between said passageway and said water supply channel, and an air inlet opening communicating between said passageway and said air supply channel, the portion of said passageway between said air inlet opening and said water inlet opening including a venturi.

25. In a whirlpool system including a water receptacle, a plurality of outlets spaced around the interior of the water receptacle, a water supply conduit connected to a source of water, an air supply conduit connected to a source of air, and connecting means for receiving water and air from the water and air supply conduits, respectively, for mixing the received water and air, and for delivering the mixed water and air to each of the outlets, the improvement wherein said connecting means is removably mounted to the water supply conduit and the air supply conduit between the respective ends of the conduits, whereby said connecting means may be replaced independently of the water and air supply conduits.

26. A whirlpool system according to claim 25, wherein said connecting means includes a plurality of nozzles, one for each of the outlets, each of said nozzles extending through the water and air supply conduits, one end of each of said nozzles extending outwardly from the air supply conduit for connection to a corresponding one of the outlets, the other end of each of said nozzles extending outwardly from the water supply conduit, each of said nozzles including a passageway extending therethrough from said one end to said other end, a water inlet opening communicating between the water supply channel and said passageway, and an air inlet opening communicating between the air supply channel and said passageway, the portion of said passageway between said air inlet opening and said water inlet opening including a venturi.

27. A whirlpool system according to claim 25, wherein said connecting means includes a plurality of saddle clamps, one for each of the outlets, each of said saddle clamps including a pair of saddle members, one of said saddle members being positioned to one side of the air and water supply conduits and the other of said saddle members being positioned to an opposite side of the air and water supply conduits, said one of said saddle members having a passageway extending therethrough and communicating with a corresponding one of the outlets, a water inlet opening communicating between said passageway and the water supply conduit, and an air inlet opening communicating between said passageway and the air supply conduit, the portion of said passageway between said air inlet opening and said water inlet opening including a venturi.

28. A whirlpool system according to claim 25, wherein said connector means includes a plurality of saddle clamps, one for each of the outlets, each of said saddle clamps including a pair of saddle members, one of said saddle members being positioned to one side of the water and air supply conduits and the other of said saddle members being positioned to an opposite side of the water and air supply conduits, one of said saddle members having a passageway extending therethrough and communicating between the air supply conduit and a corresponding one of the outlets.

29. A whirlpool system according to claim 25, wherein said connecting means includes a plurality of nozzles, one for each of the outlets, each of said nozzles extending through the air supply conduit, one end of each of said nozzles extending outwardly of the air supply conduit for connection to a corresponding one of the outlets and the other end of each of said nozzles communicating with the water supply conduit, each of said nozzles including a passageway extending therethrough from said one end to said other end, and an air inlet opening communicating between said passageway and the air supply conduit, the portion of said passageway between said air inlet opening and said other end of said nozzle including a venturi.

30. A whirlpool system according to claim 25, wherein said connecting means includes a plurality of saddle clamps, one for each of the outlets, each of said saddle clamps including a pair of saddle members, one of said saddle members having a passageway communicating with a corresponding one of the outlets, a water inlet opening communicating between said passageway and the water supply conduit, and an air inlet opening communicating between said passageway and the air supply conduit, the portion of said passageway between said air inlet opening and said water inlet opening including a venturi.

* * * * *